April 8, 1930.  A. L. DORFNER  1,753,881
APPARATUS FOR RECOVERING GASOLINE SOLVENT
Filed Jan. 25, 1927  2 Sheets-Sheet 1
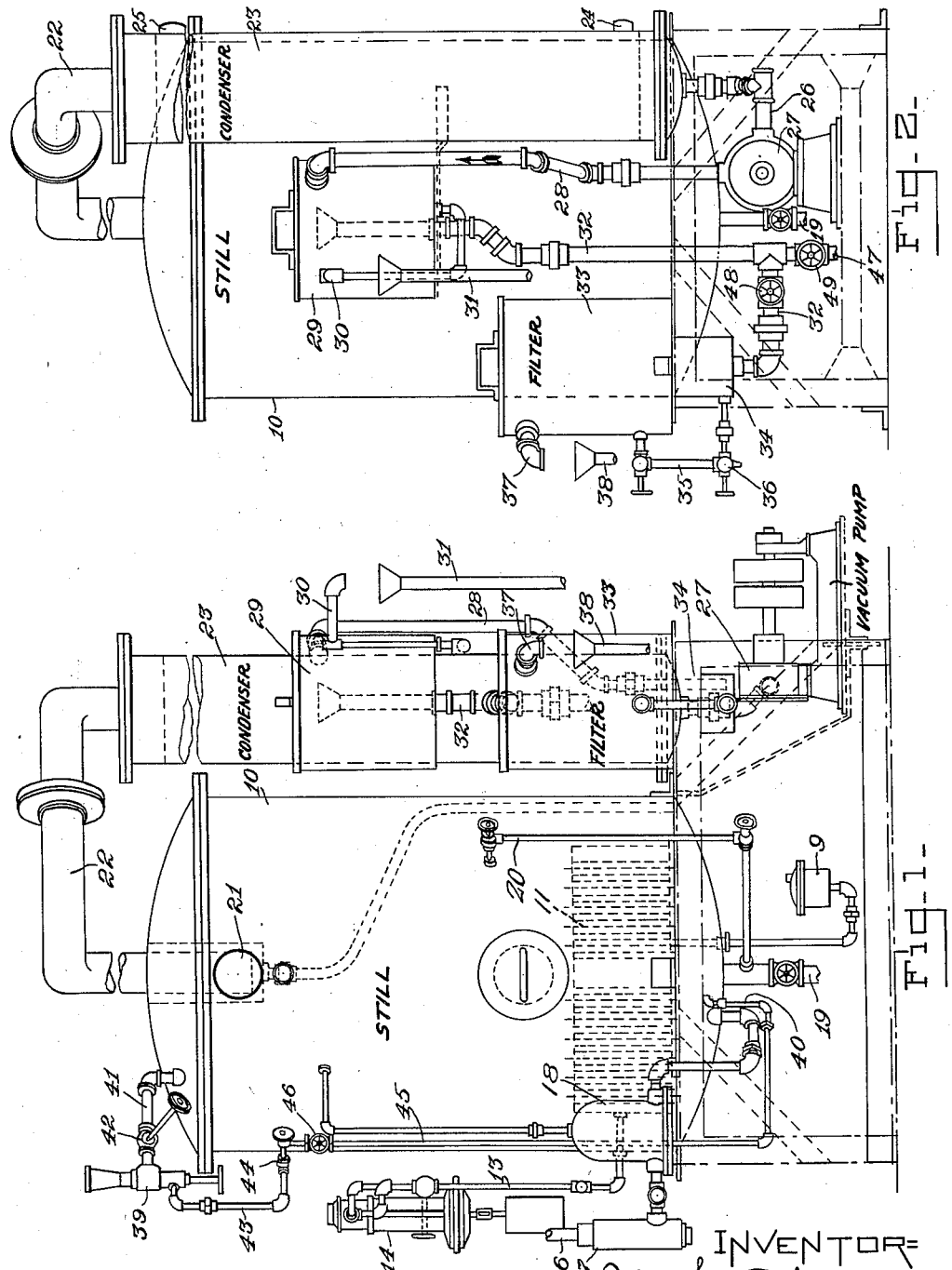

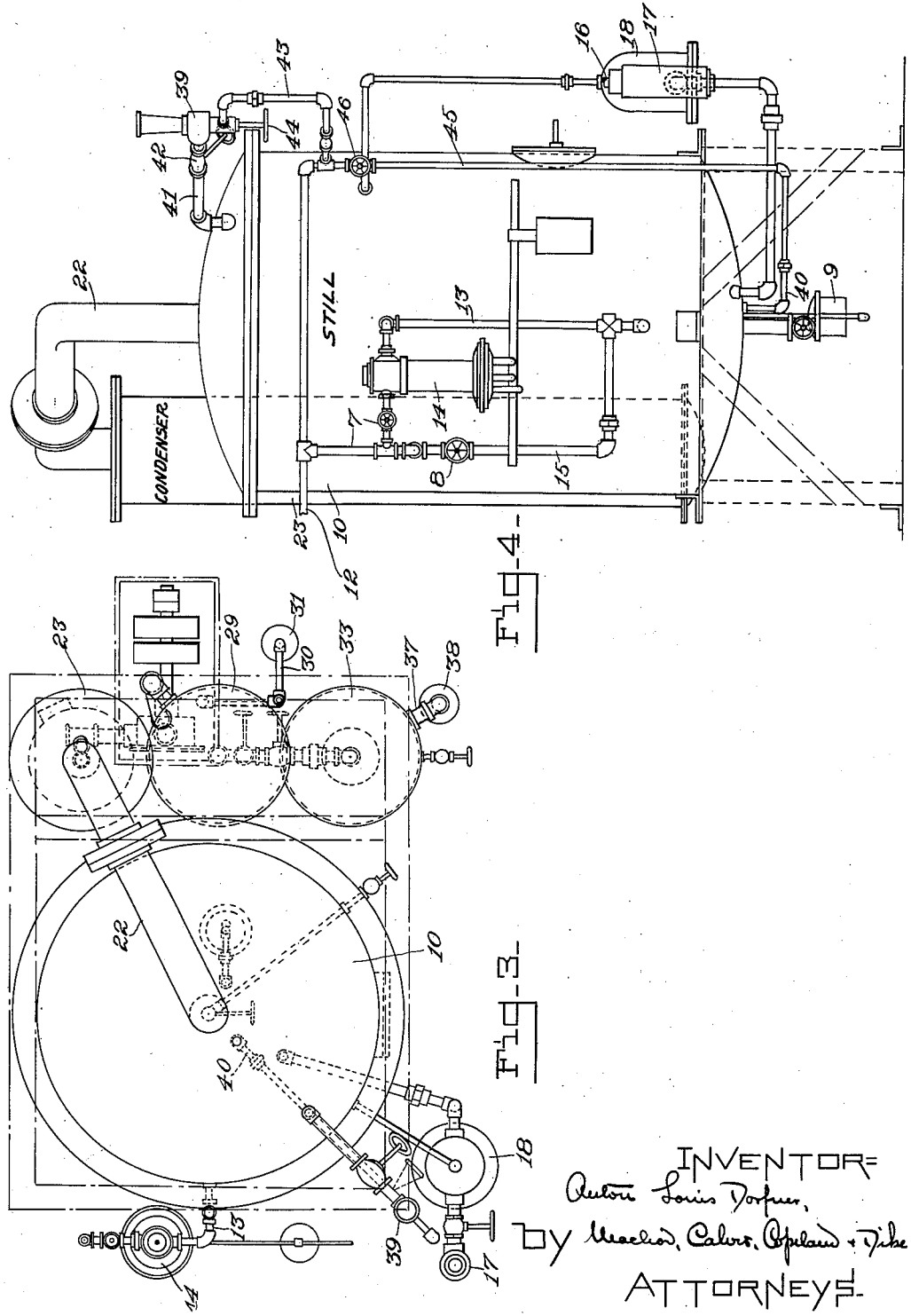

Patented Apr. 8, 1930

1,753,881

UNITED STATES PATENT OFFICE

ANTON LOUIS DORFNER, OF PHILADELPHIA, PENNSYLVANIA, ASSIGNOR TO BAEUERLE & MORRIS, INC., OF PHILADELPHIA, PENNSYLVANIA, A CORPORATION OF PENNSYLVANIA

APPARATUS FOR RECOVERING GASOLINE SOLVENT

Application filed January 25, 1927. Serial No. 163,527.

In dry cleaning and similar establishments, in which gasoline has been used as a cleansing agent, it has been the custom to reclaim the used gasoline by distilling the same to remove the impurities and water therefrom. This has usually been done in a still heated by steam. More recently, there have been developed, for cleaning purposes, certain substitutes for gasoline known as "gasoline solvents". An example of these is varnolene, which is a petroleum fraction having an initial boiling point, at atmospheric pressure, between 300° F. and 310° F. and a dry or maximum boiling point betwen 400° F. and 415° F. These gasoline solvents are as well adapted as gasoline for cleaning purposes but are much safer to use as they are much less volatile and inflammable. By reason, however, of the higher boiling points of these gasoline solvents it has been impracticable to recover them by the use of the stills previously employed for reclaiming gasoline, due to the high steam pressure required and large loss entailed, and it has been customary to purify the solvent by putting it into a settling tank with a solution of caustic and water, settling, and withdrawing the purified solvent from the top of the tank. This method requires a considerable length of time and has to be done very carefully in order to obtain satisfactory results. Moreover, it is impossible to separate the mineral oils in this way, so that the recovered solvent is not as effective as originally.

The present invention has for its object to provide an apparatus for recovering such gasoline solvents by distillation, which apparatus is of compact form suitable for use in establishments of the character referred to, and in which an excessively high heat is not required, the necessary heat being provided by the use of steam at moderate pressure.

The more particular objects of the invention, together with means whereby the latter may be carried into effect, will best be understood from the following description of a preferred embodiment thereof illustrated in the accompanying drawings, in which:

Fig. 1 is a front elevation.

Fig. 2 is a side elevation, looking from the right in Fig. 1.

Fig. 3 is a plan view, and

Fig. 4 is a side elevation, looking from the left in Fig. 1.

In the form of the invention shown, the still comprises a vacuum chamber 10 having therein a heating element or calandria in the form of a steam drum having a series of tubes 11. Live steam from a suitable main 12 (Fig. 4) may be supplied to said drum through a pipe 13 under the control of a pressure regulator 14 of any suitable type, a by-pass 15 about said regulator being preferably provided, and the flow of steam through said regulator and by-pass respectively being controlled by valves 7 and 8. A steam trap 9 is provided for the heating element or tubes 11. The solvent to be reclaimed is supplied from the feed tank (not shown) through a pipe 16 preferably provided with a strainer 17 and is introduced through a feed trap 18 of any suitable type to the vacuum chamber 10 which is preferably provided with a valve controlled drain pipe 19, sight gauge 20, and vacuum gauge 21. At its top, the vacuum chamber 10 communicates through a pipe 22 with a vertically disposed condenser 23 through which water or other cooling medium may be circulated through pipes 24 and 25. The outlet of the condenser 23 communicates through a pipe 26 with the inlet of a rotary vacuum pump 27.

From the foregoing it will be seen that the vacuum pump 27 will operate, through the condenser 23, to maintain a condition of vacuum in the still, making it possible to distill the solvent at a temperature which can be maintained by supplying steam at moderate pressure to the heating element 11. Inasmuch however as the boiling point of the solvent is higher than that of water under the same conditions of pressure, such water as may be in the solvent is not removed by the distillation process. It therefore becomes necessary, in order to purify the solvent completely, to provide additional means for removing the water. Such means as herein shown are as follows:

The pump 27 is preferably a combined vacuum and force pump and is arranged to discharge through a pipe 28 into the inlet of a water separator 29 disposed above or at a higher lever than said pump. The separator 29 may be of any suitable or usual type and has a water overflow 30, adapted to discharge into a conduit 31 leading to a sewer or other point of disposal, and a solvent outlet 32 which communicates with the inlet of a gravity filter 33 of any suitable type, said filter as shown being provided at the bottom with a well or sump 34 through which the solvent is introduced and in which the separated water accumulates, and with a gauge glass 35 communicating with said well and having a drain cock 36 through which the accumulated water can, from time to time, be withdrawn. The filter 33 is disposed at a lower level than the separator 29, so that the solvent flows by gravity from the latter to the former through the pipe 32, the recovered solvent being discharged from the filter through an outlet 37 into a suitable pipe 38 leading to the distillate storage tank, not shown. The separator 29 removes the bulk of the water from the solvent, but it is found that said solvent can be completely freed of water or "dried" only by filtration. The final purification therefore takes place in the filter, but since only a relatively small amount of water remains, the flow through said filter may be relatively rapid.

In operation, the solvent to be purified is passed into the chamber 10 through the pipe 16. The vacuum pump 27 is then actuated and steam admitted to the steam drum 11 under a pressure of from 15 to 40 lbs. per square inch depending upon the capacity required. By the use of the vacuum pump a vacuum of about 25 inches is created, whereby the boiling point of the solvent is lowered and said solvent vaporized. The vapor, at a temperature of about 220° F., is drawn by the vacuum pump through the condenser 23, where it is condensed, and the condensed distillate is forced by the pump 27 through the pipe 28 into the separator 29 where water is removed. The distillate then passes by gravity through the pipe 32 into the filter 33. The dried distillate is then discharged from the filter through the outlet 37 into a suitable pipe 38 leading to the distillate storage tank, not shown. Any impurities present in the solvent which are not volatilized remain in the still and may be drained out conveniently through the drain pipe 19.

It will be seen that the apparatus as thus far described will operate effectually, rapidly and economically to free gasoline solvent of relatively high boiling point of all of the impurities which it contains, and that said apparatus is well suited to the conditions available in cleaning establishments and is of simple and compact construction so as not to occupy an excessive amount of valuable space. In this connection it will be seen that the pump 27 serves not only to maintain the required pressure in the vacuum tank but also to transfer the distillate from the condenser to the gravity water separator, which latter may therefore be disposed at a relatively high elevation, permitting the solvent to flow therefrom by gravity into the filter 33.

As above stated, the vacuum pump 27 is of the rotary type, which type of pump has been found to be eminently well suited to its intended purpose, and, in fact, virtually required in a commercially practicable apparatus, due to its relatively high capacity and low cost. Such a pump, however, will not pull a dry vacuum of the necessary amount to enable the apparatus to start promptly and unless absolutely tight it is doubtful whether it would be capable of starting the operation at all. To overcome this objection, means are provided for introducing steam into the body of the liquid near the bottom of the vacuum chamber 10, said means, as shown, comprising a sparger 40 supplied with steam through a branch pipe 45 leading from the steam main 12 and controlled by a valve 46. The steam introduced by the sparger 40 passes through the liquid in the still and fills the still chamber with vapor which passes out through the vapor pipe 22 and into the condenser 23. The vapor thus carries with it the air from the still chamber, and when it enters the condenser, condensation commences and immediately creates a vacuum in addition to that created by the pump. The condensed vapor then passes on to the pump and provides a liquid for the latter to work on, thereby increasing the pull of the pump. In practice it has been found that, even with a tight pump, it may require as much as an hour to start the operation of the apparatus without the introduction of steam, whereas the same apparatus can be started in a few minutes with the introduction of steam.

The sparger 40 is also used to remove all of the solvent before the still is shut down to avoid any possible loss. The valve controlling the feed line 16 is closed and the still is run until sight glass 20 shows solvent level near the bottom of the still. The sparger 44 is then opened and steam introduced. This mixes with the residue in the bottom of the still body, and creates a vapor which passes to the condenser, and thus removes all solvent from the residue. The solvent removed in this manner is accompanied by moisture and it is preferably returned to the feed tank through a by-pass 47, controlled by valves 48 and 49, in order to prevent it entering the filter 33.

For the purpose of aiding in establishing the required initial vacuum in the still, there may be employed, in addition to the sparger 40, an auxiliary vacuum pump in the form of an ejector 39. Said ejector may be of any suitable or well known form having a suction pipe 41 communicating with the vacuum chamber 10 and controlled by a valve 42, and a steam nozzle supplied with steam through a second branch pipe 43 leading from the branch pipe 45 and controlled by a valve 44.

Having thus described my invention, I claim:

1. An apparatus for recovering dry cleaning solvents and adapted for installation and operation in dry cleaning establishments, said apparatus including, in combination, a vacuum chamber, means for heating the same, a condenser communicating with said chamber, a valvless rotary pump of relatively high capacity and speed of operation having its inlet communicating directly with said condenser so as to receive the distillate therefrom, and means for introducing steam into said chamber to expel the air therefrom and, by its condensation in said condenser, supply liquid to said pump to enable the latter to draw a vacuum in said chamber.

2. An apparatus for recovering dry cleaning solvents and adapted for installation and operation in dry cleaning establishments, said apparatus including, in combination, a vacuum chamber, means for heating the same, a condenser communicating with said chamber, a valveless rotary pump of relatively high capacity and speed of operation having its inlet communicating directly with said condenser so as to receive the distillate therefrom, and means for introducing steam into the body of the liquid near the bottom of said chamber to expel the air therefrom and, by its condensation in said condenser, supply liquid to said pump to enable the latter to draw a vacuum in said chamber.

3. An apparatus for recovering dry cleaning solvents and adapted for installation and operation in dry cleaning establishments, said apparatus including, in combination, a vacuum chamber, means for heating the same, a condenser communicating with said chamber, a valveless rotary pump of relatively high capacity and speed of operation having its inlet communicating directly with said condenser so as to receive the distillate therefrom, means for introducing steam into said chamber to expel the air therefrom and, by its condensation in said condenser, supply liquid to said pump to enable the latter to draw a vacuum in said chamber, and means into which said pump discharges for drying the distillate.

In testimony whereof I affix my signature.

ANTON LOUIS DORFNER.